(12) United States Patent
Ying

(10) Patent No.: US 11,115,496 B2
(45) Date of Patent: Sep. 7, 2021

(54) DYNAMICALLY-ORGANIZED SYSTEM FOR DISTRIBUTED CALCULATIONS

(71) Applicant: Advanced New Technologies Co., Ltd., Grand Cayman (KY)

(72) Inventor: Pengfei Ying, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/945,655

(22) Filed: Jul. 31, 2020

(65) Prior Publication Data
US 2020/0366755 A1 Nov. 19, 2020

Related U.S. Application Data

(63) Continuation of application No. 16/152,459, filed on Oct. 5, 2018, now Pat. No. 10,986,207.

(30) Foreign Application Priority Data

Oct. 9, 2017 (CN) .......................... 201710930759.3

(51) Int. Cl.
| | | |
|---|---|---|
| H04L 29/08 | (2006.01) | |
| H04L 29/06 | (2006.01) | |
| G06Q 40/02 | (2012.01) | |

(52) U.S. Cl.
CPC ........... *H04L 67/32* (2013.01); *G06Q 40/025* (2013.01); *H04L 63/0407* (2013.01); *H04L 67/10* (2013.01)

(58) Field of Classification Search
CPC ..... H04L 67/32; H04L 63/0407; H04L 67/10; G06Q 40/025
(Continued)

(56) References Cited

U.S. PATENT DOCUMENTS

| 5,940,812 A | 8/1999 | Tengel et al. |
| 6,112,225 A * | 8/2000 | Kraft .................... G06F 9/5072 |
| | | 709/201 |

(Continued)

FOREIGN PATENT DOCUMENTS

| CN | 102301376 | 12/2011 |
| CN | 104507048 | 4/2015 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — David P Zarka
(74) *Attorney, Agent, or Firm* — Fish & Richardson P.C.

(57) ABSTRACT

Techniques for providing a data request method are described. A data request is received from a user requesting a calculation. In response to receiving the data request, an inquiry message is transmitted to a plurality of service nodes. A confirmation message is received from each service node from the plurality of service nodes, wherein the confirmation message comprises data indicating whether a service node will participate in the requested calculation or will not participate in the requested calculation. A contribution of the service node is determines based on the confirmation message. A resource is allocated to each service node that will participate in the requested calculation.

18 Claims, 6 Drawing Sheets

(58) Field of Classification Search
USPC ........................................................ 709/205
See application file for complete search history.

(56) References Cited

U.S. PATENT DOCUMENTS

| | | | |
|---|---|---|---|
| 7,693,791 B2 | 4/2010 | Hahn-Carlson et al. | |
| 8,095,458 B2* | 1/2012 | Peterson | G06Q 40/00 705/38 |
| 8,321,870 B2* | 11/2012 | Messier | G06F 9/5066 718/102 |
| 2002/0052773 A1* | 5/2002 | Kraemer | G06Q 10/06398 705/7.14 |
| 2002/0055866 A1* | 5/2002 | Dewar | G06Q 10/0639 705/7.38 |
| 2002/0174008 A1* | 11/2002 | Noteboom | G06Q 10/10 705/7.14 |
| 2003/0074330 A1 | 4/2003 | Asokan et al. | |
| 2003/0083891 A1* | 5/2003 | Lang | G06Q 10/1053 705/321 |
| 2003/0144862 A1* | 7/2003 | Smith | G06Q 10/10 705/321 |
| 2004/0230521 A1 | 11/2004 | Broadbent et al. | |
| 2005/0102177 A1* | 5/2005 | Takayama | G06Q 30/02 705/14.4 |
| 2006/0235884 A1* | 10/2006 | Pfenninger | G06Q 50/10 |
| 2007/0282738 A1 | 12/2007 | Highbloom | |
| 2008/0235265 A1* | 9/2008 | Hirsch | G06Q 10/06 |
| 2008/0243719 A1 | 10/2008 | Shavit et al. | |
| 2010/0312691 A1* | 12/2010 | Johnson, Jr. | G06Q 40/025 705/38 |
| 2011/0055098 A1* | 3/2011 | Stewart | G06Q 10/1053 705/321 |
| 2011/0112977 A1* | 5/2011 | Baumgarten | G06Q 10/1053 705/321 |
| 2012/0072253 A1* | 3/2012 | Ritter | G06Q 10/06393 705/7.13 |
| 2012/0215673 A1 | 8/2012 | Usher et al. | |
| 2012/0215709 A1* | 8/2012 | Nanda | G09B 7/02 705/321 |
| 2012/0221886 A1* | 8/2012 | Barsness | G06F 11/1482 714/4.2 |
| 2013/0138554 A1* | 5/2013 | Nikankin | G06Q 40/02 705/38 |
| 2013/0282606 A1* | 10/2013 | Bhagat | G06Q 10/1053 705/321 |
| 2013/0297552 A1* | 11/2013 | Bansal | G06N 5/02 706/50 |
| 2013/0311244 A1* | 11/2013 | Abotchie | G06Q 10/1053 705/7.39 |
| 2014/0058954 A1* | 2/2014 | Perlstein | G06Q 50/188 705/80 |
| 2014/0122355 A1* | 5/2014 | Hardtke | G06Q 10/105 705/321 |
| 2014/0279383 A1* | 9/2014 | Morgan | G06Q 40/025 705/38 |
| 2014/0297550 A1* | 10/2014 | Miller | G06Q 10/1053 705/321 |
| 2014/0358765 A1* | 12/2014 | Agius | G06Q 40/025 705/38 |
| 2015/0339769 A1 | 11/2015 | deOliveira et al. | |
| 2015/0356511 A1* | 12/2015 | Campesi | G06Q 10/1053 705/321 |
| 2016/0026963 A1* | 1/2016 | Rathod | G06Q 10/063112 705/7.14 |
| 2017/0076380 A1* | 3/2017 | Dintenfass | H04L 67/306 |
| 2017/0169508 A1* | 6/2017 | Song | G06Q 40/025 |
| 2017/0264710 A1* | 9/2017 | Muntes Mulero | H04L 67/327 |
| 2018/0158026 A1* | 6/2018 | Zentefis | G06Q 10/1053 |
| 2019/0109923 A1 | 4/2019 | Ying | |

FOREIGN PATENT DOCUMENTS

| | | |
|---|---|---|
| TW | 201520943 | 6/2015 |
| TW | 1515682 | 1/2016 |
| WO | WO 2011085497 | 7/2011 |

OTHER PUBLICATIONS

International Search Report and Written Opinion in International Application No. PCT/US2018/055032, dated Jan. 8, 2019, 13 pages.
Nakamoto, "Bitcoin: A Peer-to-Peer Electronic Cash System," www.bitcoin.org, 2005, 9 pages.
PCT International Preliminary Report on Patentability in International Application No. PCT/US2018/055032, dated Dec. 20, 2019, 24 pages.
PCT Second Written Opinion of the International Preliminary Examining Authority in International Application No. PCT/US2018/055032, dated Sep. 24, 2019, 9 pages.

* cited by examiner

DYNAMICALLY-ORGANIZED SYSTEM FOR DISTRIBUTED CALCULATIONS

CROSS-REFERENCE TO RELATED APPLICATIONS

This application is a continuation of and claims the benefit of priority of U.S. patent application Ser. No. 16/152,459, filed Oct. 5, 2018, which claims priority to Chinese Patent Application No. 201710930759.3, filed on Oct. 9, 2017, which is hereby incorporated by reference in its entirety.

TECHNICAL FIELD

The present specification relates to the field of computer software technologies, and in particular, to a data request processing, inquiry message processing method, apparatus, and device.

BACKGROUND

With the rapid development of computer and Internet technologies, many services can be implemented with Internet, bringing convenience to users. Some services need coordinated calculation performed by multiple service providers. For example, risk control service for multiple loans, the service providers are financial institutions, a loan applicant may borrow from one or more financial institutions, and how to implement risk control over all the applicant's loans is a problem that needs to be considered.

SUMMARY

Implementations of the present specification provide a data request processing, inquiry message processing method, apparatus, and device, so as to solve the following technical problem: risk control over a loan applicant needs to be implemented for multiple loans.

To solve the previous technical problem, the implementations of the present specification are implemented as described below.

An implementation of the present specification provides a data request processing method, and the data request processing method includes receiving a data request; sending an inquiry message to each service node, so as to inquire whether each service node participates in calculation of the responding data included in the data request; receiving a participation confirmation message from the service node, where the service node sending the participation confirmation message includes a service node having corresponding service data or a service node that has no corresponding service data but satisfies a designated condition, and the corresponding service data includes data used to calculate the responding data; and allocating a resource to the service node based on the received participation confirmation message.

An implementation of the present specification provides an inquiry message processing method, and the inquiry message processing method includes the following: receiving an inquiry message sent by an agent node after a data request is received, where the inquiry message is used to inquire whether each service node participates in calculation of the responding data included in the data request; determining whether corresponding service data is possessed, where the corresponding service data includes data used to calculate the responding data; and if the corresponding service data is not possessed, determining whether a designated condition is satisfied; and if the designated condition is satisfied, returning a participation confirmation message to the agent node.

An implementation of the present specification provides a data request processing apparatus, and the data request processing apparatus includes a first receiving module, configured to receive a data request; a sending module, configured to send an inquiry message to each service node, so as to inquire whether each service node participates in calculation of responding data included in the data request; a second receiving module, configured to receive a participation confirmation message from the service node, where the service node sending the participation confirmation message includes a service node having corresponding service data or a service node that has no corresponding service data but satisfies a designated condition, and the corresponding service data includes data used to calculate the responding data; and a determination module, configured to allocate a resource to the service node based on the received participation confirmation message.

An implementation of the present specification provides an inquiry message processing apparatus, and the inquiry message processing apparatus includes a receiving module, configured to receive an inquiry message sent by an agent node after receiving a data request, where the inquiry message is used to inquire whether each service node participates in calculation of responding data included in the data request; a processing module, configured to determine whether corresponding service data is possessed, where the corresponding service data includes data used to calculate the responding data, and if the corresponding service data is not possessed, the processing module determines whether a designated condition is satisfied, if the designated condition is satisfied, the processing module returns a participation confirmation message to the agent node.

An implementation of the present specification provides a data request processing device, and the data request processing device includes at least one processor; and a memory connected to the at least one processor, where the memory stores an instruction that can be executed by the at least one processor, and the instruction is executed by the at least one processor, so as to enable the at least one processor to receive a data request, send an inquiry message to each service node, so as to inquire whether each service node participates in calculation of responding data included in the data request; receive a participation confirmation message from the service node, where the service node sending the participation confirmation message includes a service node having corresponding service data or a service node that has no corresponding service data but satisfies a designated condition; and the corresponding service data includes data used to calculate the responding data; and allocate a resource to the service node based on the received participation confirmation message.

An implementation of the present specification provides an inquiry message processing device, and the inquiry message processing device includes at least one processor and a memory communicatively connected to the at least one processor, where the memory stores an instruction that can be executed by the at least one processor, and the instruction is executed by the at least one processor, so as to enable the at least one processor to receive an inquiry message sent by an agent node after a data request is received, where the inquiry message is used to inquire whether each service node participates in calculation of responding data included in the data request; determine whether corresponding service data is possessed, where the corresponding service data includes data used to calculate the responding data; and if the corresponding service data is not possessed, determine whether a designated condition is satisfied; and if the designated condition is satisfied, return a participation confirmation message to the agent node.

The technical solutions used in the implementations of the present specification can achieve the following beneficial effects: Risk control over the loan applicant can be implemented based on coordinated calculation performed by multiple service nodes; and for any coordinated calculation, based on an idea of differential privacy, some service nodes that have no corresponding service data can be dynamically enabled to serve as obfuscating nodes to participate in the coordinated calculation. Therefore, data privacy of the service node can be improved, a service node that has no corresponding service data can be excluded from the coordinated calculation, and further, resources can be more reasonably allocated to the service nodes based on whether the service nodes participate.

BRIEF DESCRIPTION OF DRAWINGS

To describe technical solutions in implementations of the present specification or in the existing technology more clearly, the following briefly describes the accompanying drawings required for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

In a loan application scenario, to implement risk control over a loan applicant, usually multiple financial institutions need to participate in coordinated calculation. Generally, service providers are usually predetermined and relatively fixed. Regardless of whether the service provider has corresponding service data (for example, the corresponding service data is a payment history, a current amount of loans, etc. of the loan applicant) needed for coordinated calculation, when allocating resources such as business profits, the profits are allocated evenly. This even allocation method sometimes is not reasonable. There is a need for a more reasonable resource allocation solution without leaking related privacy.

Implementations of the present specification provide a data request processing, inquiry message processing method, apparatus, and device.

To make a person skilled in the art better understand the technical solutions in the present specification, the following clearly and completely describes the technical solutions in the implementations of the present specification with reference to the accompanying drawings in the implementations of the present specification. Apparently, the described implementations are merely some rather than all of the implementations of the present specification. All other implementations obtained by a person of ordinary skill in the art based on the implementations of the present specification without creative efforts shall fall within the protection scope of the present application.

For ease of understanding, the idea of the solutions of the present specification is described as follows: For any coordinated calculation, based on the idea of differential privacy, some service nodes that have no corresponding service data are enabled to serve as obfuscating nodes to participate in the coordinated calculation, the other service nodes that have no corresponding service data may be excluded from the coordinated calculation, and the resources may be allocated to the service nodes based on whether the service nodes participate.

Figure 1:
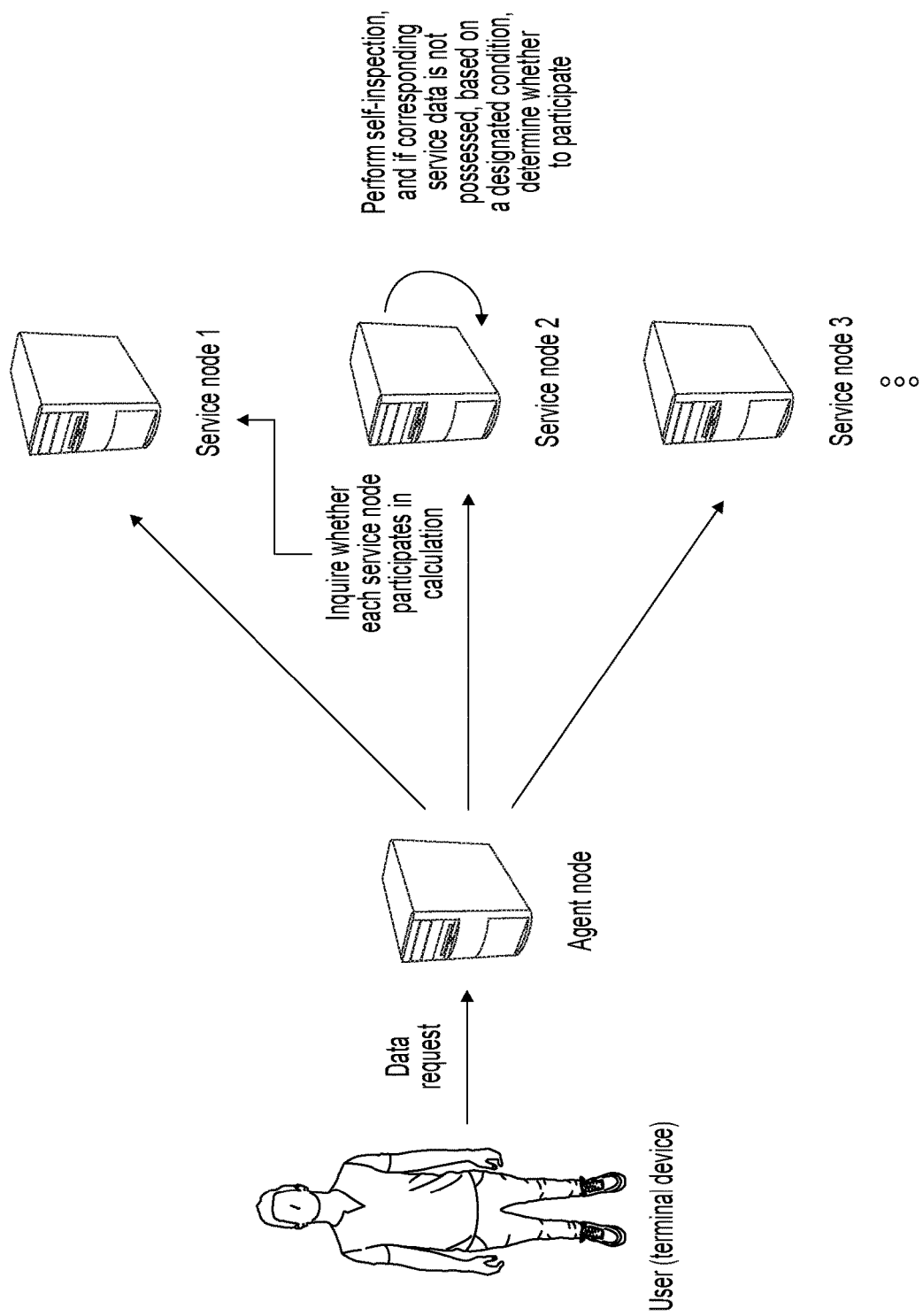
FIG. 1 is a schematic diagram illustrating an overall structure of a solution of the present specification in actual application.

FIG. 1 is a schematic diagram illustrating an overall structure of a solution of the present specification in actual application. The overall structure mainly includes three parts: a user (terminal device), an agent node, and multiple service nodes. The agent node may be configured to coordinate the service nodes, so as to implement coordinated calculation of the multiple service nodes. Generally, different service nodes respectively correspond to different service providers (for example, different financial institutions). In addition, the agent node further corresponds to another service provider (for example, a third-party payment company, etc.); or the agent node may be a service node in the service nodes, etc.

The user sends a data request to the agent node, and the agent node separately inquires the service nodes whether the service nodes participate in calculation. The service nodes separately perform self-inspection. The service node that has corresponding service data can directly determine to participate. Based on a designated condition (the designated condition is used to select an obfuscating node), the service node that has no corresponding service data can determine whether to participate. The agent node allocates resources to the service nodes based on whether the service nodes participate.

Based on the previous ideas and overall structure, the following separately describes the solutions of the present specification in detail from the perspective of the agent node and from the perspective of the service node.

Figure 2:
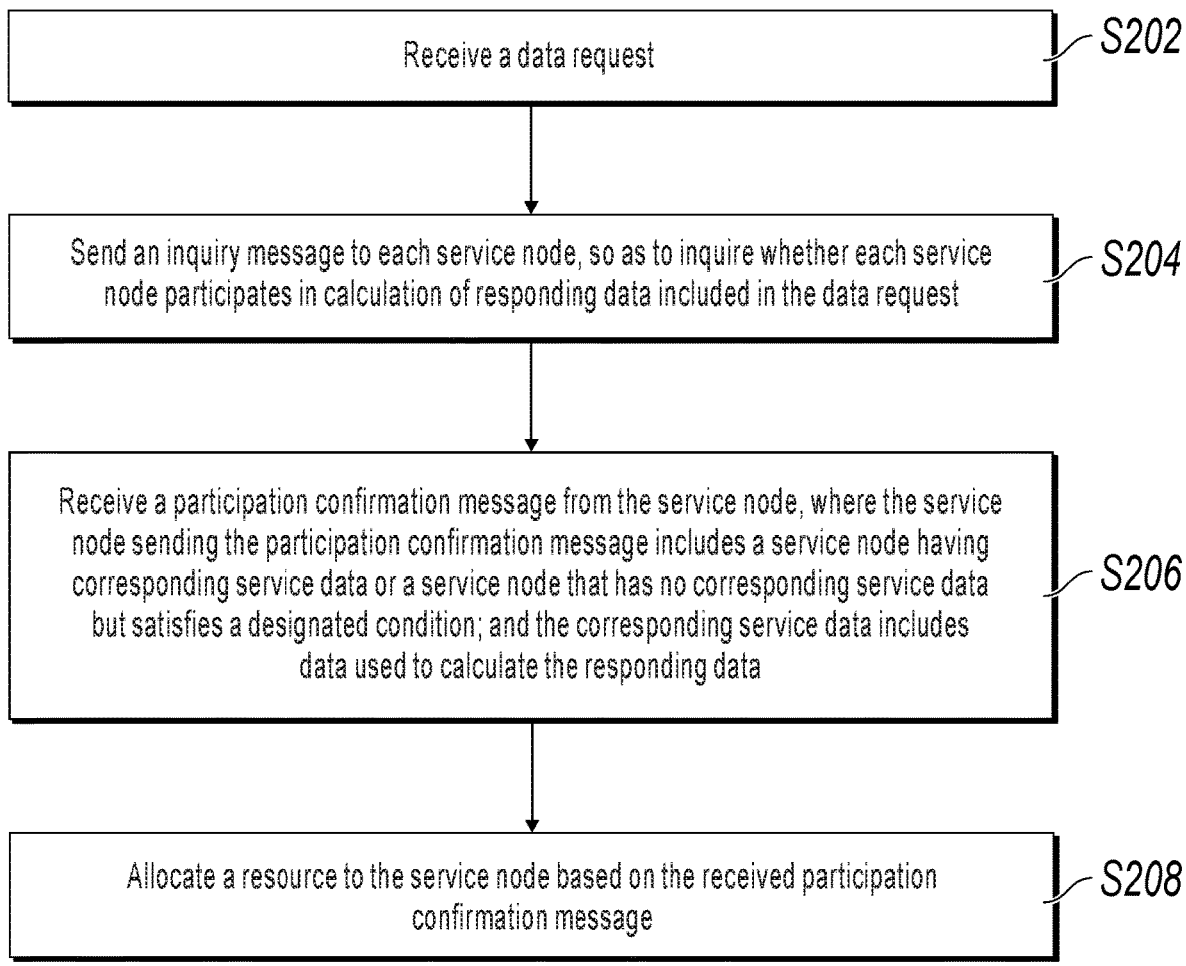
FIG. 2 is a schematic flowchart illustrating a data request processing method, according to an implementation of the present specification.

FIG. 2 is a schematic flowchart illustrating a data request processing method, according to an implementation of the present specification. An execution body of the procedure is a computing device serving as an agent node.

The procedure in FIG. 2 can include the following steps.

S202. Receive a data request.

In the present implementation of the present specification, the data request may be a data query request, a data analysis and mining request, or another request, and the data request can include a keyword.

S204. Send an inquiry message to each service node, so as to inquire whether each service node participates in calculation of responding data included in the data request.

In the present implementation of the present specification, to obtain the responding data included in the data request, one or more service nodes need to participate in calculation.

For example, the data request is a data query request. A user can input an identity card number of a person as a keyword, so as to query the agent node about a current sum of loans of the person from multiple financial institutions. A service node of each financial institution returns a response indicating whether the service node of the financial institution participates in calculation, and final responding data obtained through calculation includes the sum of loans. As such, the service node can be a financial institution server, and the financial institution includes but is not limited to a bank, an insurance company, a third-party payment institution, etc.

Certainly, in actual application, the provider of the service node is not limited to the financial institution, and may be a government, a school, a shop, an institution, a company, etc. In addition, each time the procedure in FIG. 2 is executed, the service nodes are not necessarily the same, and the number of service nodes may change.

S206. Receive a participation confirmation message from the service node, where the service node sending the participation confirmation message includes a service node having corresponding service data or a service node that has no corresponding service data but satisfies a designated condition; and the corresponding service data includes data used to calculate the responding data.

In the present implementation of the present specification, the corresponding service data is the data needed to calculate and affects the responding data.

Reference is made to the example of step S204. In the example, the corresponding service data can be a corresponding loan amount record. If a person is not on loan from a certain financial institution, the financial institution does not have the person's loan amount record. In other words, the financial institution does not have the corresponding service data for the current query request.

Generally, the responding data is obtained by collecting statistics of corresponding service data. For example, the statistics include calculation such as summation, maximization, minimization, or averaging.

In the present implementation of the present specification, a calculation process is preferably a multi-party secured calculation process, and by using a particular policy, the calculation process can ensure that a calculation result is obtained through multi-party coordinated calculation based on the premise that corresponding service data (which is private data) of each party is not leaked to another party. For example, the particular policy includes secret sharing, an obfuscating circuit, etc.

Further, if only several parties that have corresponding service data participate in the calculation, although the corresponding service data is not leaked, the fact that the several parties having corresponding service data is easy to result in leakage; thus can be harmful to the parties' data privacy. Such problem can be solved based on the idea of differential privacy, which is described in detail below.

In the present implementation of the present specification, at least one service node that has the corresponding service data determines to participate in the calculation. Preferably, all the service nodes that have the corresponding service data in step S204 determine to participate in the calculation.

Further, based on the idea of differential privacy, some service nodes that have no corresponding service data may be selected as obfuscating nodes by using the designated condition, and the selected service nodes also participate in the calculation. The participation of the obfuscating nodes makes it difficult for other parties other than the parties participated in the calculation to determine whether the participated parties have the corresponding service data, thereby improving data privacy.

In addition, in the calculation process, because the obfuscating nodes have no corresponding service data, even though the obfuscating nodes actually participate in the calculation, the obfuscating nodes usually have no substantial impact on the responding data, thereby still ensuring reliability of the responding data.

In the present implementation of the present specification, the designated condition may be determined based on actual scenarios. For example, a designated condition can be that one or more attributes of the service node have reached a predetermined threshold. As another example, the designated condition can be that a random number generated by the service node that has no corresponding service data is less than a probability value generated based on current scenario information.

The obfuscating node selected each time may dynamically change, and the designated condition may dynamically change, thereby enhancing the obfuscating effect. Certainly, if all service node that has no corresponding service data do not satisfy the designated condition at one time, no obfuscating node may participate at that time.

S208. Allocate a resource to the service node based on the received participation confirmation message.

In the present implementation of the present specification, for each coordinated calculation, a certain contribution may be offered to the service node that determines to participate in the calculation, and no corresponding contribution or only a smaller contribution is offered to the service node that determines not to participate in the calculation. Based on the contribution, the resource may be allocated to the service node accordingly. For example, resources obtained from a sender of the data request are divided based on proportions of contributions, and are then allocated to corresponding service nodes that determine to participate in the calculation, no resource is allocated to a service node that does not participate in the calculation.

Certainly, the contribution may not be necessarily determined based only on the participation confirmation message, but may also be determined with reference to another factor. For example, another factor is a factor such as an amount of calculation performed by the service node that determines to participate in the calculation, or predetermined weights of different service nodes.

In the present implementation of the present specification, the resource can be directly allocated to the service node that sends the participation confirmation message instead of determining contribution first.

In addition, resource allocation may not be necessarily performed immediately after the participation confirmation message is received, and may be performed later in an appropriate time. For example, the resources can be allocated based on participation confirmation messages corresponding to multiple coordinated calculations.

In a background technology, the resource is mainly obtained from service fees paid by a user who sends the data request. For the service node, some business profits can be obtained by allocating the service fees. Based on the contribution of the service node, the business profits may be allocated. Certainly, in actual application, the business profits may be further allocated with reference to the contribution and other bases.

Certainly, the resource is not limited to business profits. For example, the resource may be a processor resource, a storage resource, a memory resource, a bandwidth resource, a port resource, an account resource, etc. The resource is not necessarily obtained from the user. For example, the resource may be obtained from the agent node, etc.

In the present implementation of the present specification, after all the service nodes that participate in the calculation are determined, the coordinated calculation may be performed to obtain the responding data, and the responding data is returned to the user.

In the method in FIG. 2, for any coordinated calculation, based on the idea of differential privacy, some service nodes that have no corresponding service data are dynamically enabled to serve as the obfuscating nodes to participate in the coordinated calculation, thereby improving data privacy of the service node.

In addition, a remaining service node that has no corresponding service data may be excluded from the coordinated calculation, so that resources can be more reasonably allocated based on the participation confirmation message, thereby improving subsequent coordinated calculation efficiency.

Based on the method in FIG. 2, the present implementation of the present specification further provides some detailed implementation solutions of the method and an extension solution, which are described below.

In the present implementation of the present specification, assume that the previous described designated condition that a random number generated for the inquiry message is less than a specific probability.

The specific probability can be determined by the agent node, or can be determined by the service node. The first method is used as an example. In step S206, before the participation confirmation message is received from the at least one service node, the specific probability can be further obtained and sent to the service nodes.

As mentioned above, the specific probability can be generated based on the scenario information. For example, the scenario information can include the number of all the service nodes, the designated minimum number of service nodes that participate in the calculation process, etc. For ease of understanding, an example is used for description.

For example, assume that the specific probability is denoted as P, the number of all the service nodes is denoted as C, and the designated minimum number of service nodes that participate in the calculation process is denoted as T, where T>3. The agent node can perform calculation by using an exemplary equation $$P = \frac{T}{C},$$

to determine the specific probability.

It is worthwhile to note that, if C≤T, the specific probability may not be calculated, and therefore, no obfuscating node needs to be specially selected, and all the service nodes can participate in the calculation.

In the previous example, it can be seen from the equation $$P = \frac{T}{C}$$

that, if T is fixed, the larger the value of C is, the smaller the value of P is. Assume that a value range of the random number is the same as a value range [0,1] of the probability value, from the perspective of statistics, smaller P indicates that the random number generated by the service node is more likely to be greater than the probability value, and therefore, a proportion of the obfuscating node to the service nodes that have no corresponding service data may be smaller, thereby avoiding influencing subsequent coordinated calculation efficiency caused by excessive participation of the obfuscating nodes. Further, an exemplary value is substituted into the previous example for calculation. Assume that there are 10 service nodes labeled 1 to 10, namely, C=10, and assume that T=5, the service node 1 and the service node 2 have corresponding service data, and the service node 3 to the service node 10 have no corresponding service data. The agent node substitutes the value into the previous equation $$P = \frac{T}{C},$$

a value indicating that P=50% is obtained after calculation, and then the value of P can be added to the inquiry message, and is separately sent to the service node 1 to the service node 10.

After determining that the service node 1 and the service node 2 have the corresponding service data, the service node 1 and the service node 2 can directly return participation confirmation messages to the agent node. In addition, after determining that the service node 3 to the service node 10 have no corresponding data service, the service node 3 to the service node 10 separately generate random numbers falling into the interval [0,1], and compare the random numbers with the value of P. If the random numbers are less than the value of P (50%), the service node 3 to the service node 10 return the participation confirmation messages to the agent node. Otherwise, the service node 3 to the service node 10 can determine not to participate. From the perspective of statistics, when P=50%, correspondingly, 50% of the service node 3 to the service node 10 generally return the participation confirmation messages to the agent node. As such, there are 8×50%=4 obfuscating nodes, and therefore, there are a total of 2+4=6 service nodes that participate in the calculation. The agent node can offer corresponding contributions to the six nodes.

Similarly, if C=1000, P=0.5%, and further, from the perspective of statistics, the number of obfuscating nodes is generally no more than 1000×0.5%=5.

It is worthwhile to note that the specific probability determining method in the previous example is also exemplary. For example, the agent node may not rely on scenario data, but may designate a fixed probability value as the specific probability, etc.

The previous description is mainly given from the perspective of the agent node, the following provides corresponding description from the perspective of the service node.

Figure 3:
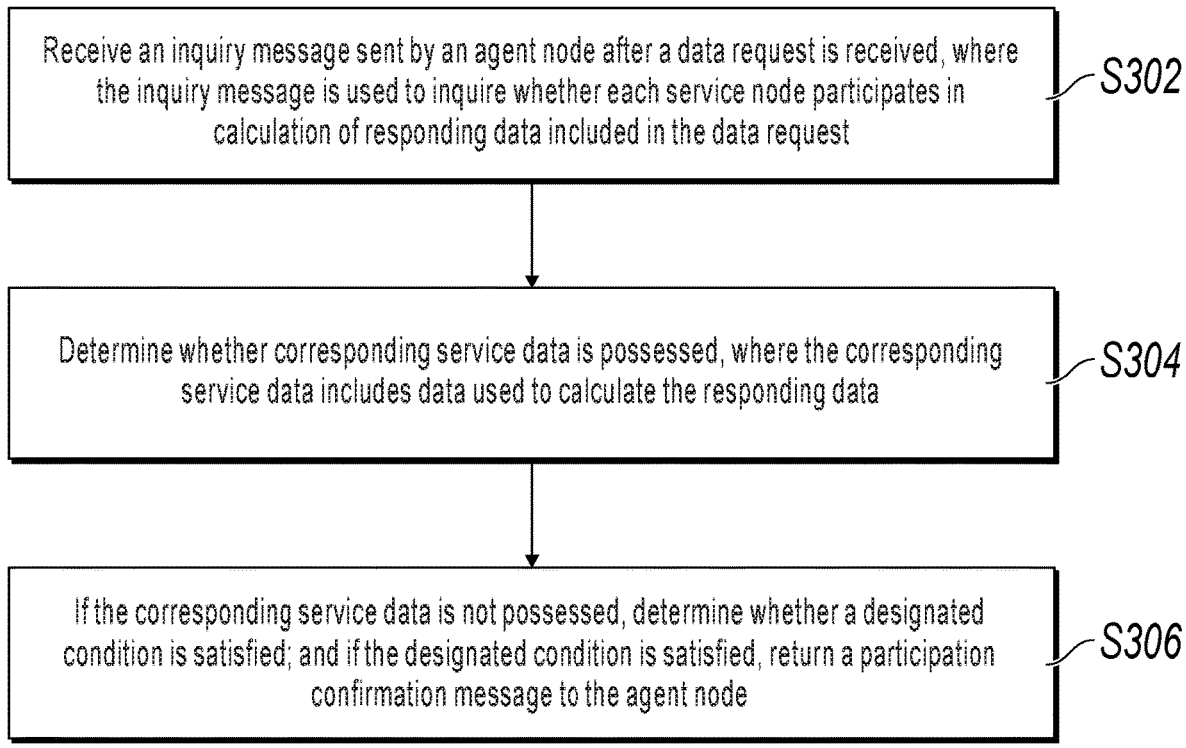
FIG. 3 is a schematic flowchart illustrating an inquiry message processing method, according to an implementation of the present specification.

Based on the same idea, as shown in FIG. 3, an implementation of the present specification further provides a schematic flowchart of an inquiry message processing method. An execution body of the procedure is a computing device serving as a service node, from the perspective of the program, the procedure is executed by a program on the service node from the perspective of the program.

In the present implementation of the present specification, programs on service nodes that execute the procedure in FIG. 3 can be uniformly provided by a certain party (for example, an agent node, etc.). As such, fairness and privacy of the service nodes are prevented from being influenced because of a difference between the programs, and implementation costs for solutions of a service provider corresponding to the service nodes are reduced.

The procedure in FIG. 3 can include the following steps.

S302. Receive an inquiry message sent by the agent node after a data request is received, where the inquiry message is used to inquire whether each service node participates in calculation of responding data included in the data request.

S304. Determine whether corresponding service data is possessed, where the corresponding service data includes data used to calculate the responding data.

S306. If the corresponding service data is not possessed, determine whether a designated condition is satisfied; and if the designated condition is satisfied, return a participation confirmation message to the agent node.

In the present implementation of the present specification, in step S304, before it is determined whether the designated condition is satisfied, a specific probability sent by the agent node can be further received.

Correspondingly, the determining whether a designated condition is satisfied can include generating a random number, and determining whether the random number is less than a specific probability; if yes, the designated condition is satisfied; otherwise, the designated condition is not satisfied.

Further, after it is determined whether the corresponding service data is possessed, if the corresponding service data is possessed, the participation confirmation message can be further returned to the agent node.

The procedure in FIG. 3 is briefly described above. To understand the procedure in FIG. 3, reference may be made to the previous description of FIG. 2. Details are omitted here for simplicity.

Figure 4:
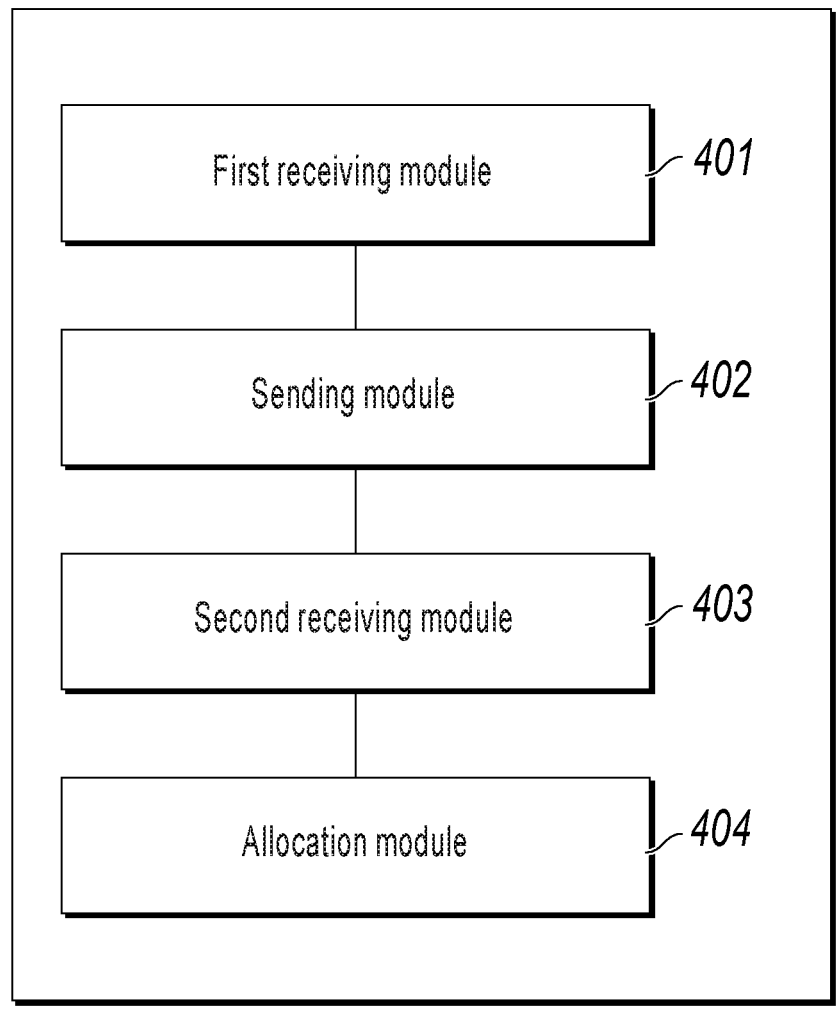
FIG. 4 is a schematic structural diagram illustrating a data request processing apparatus corresponding to FIG. 2, according to an implementation of the present specification.
Figure 5:
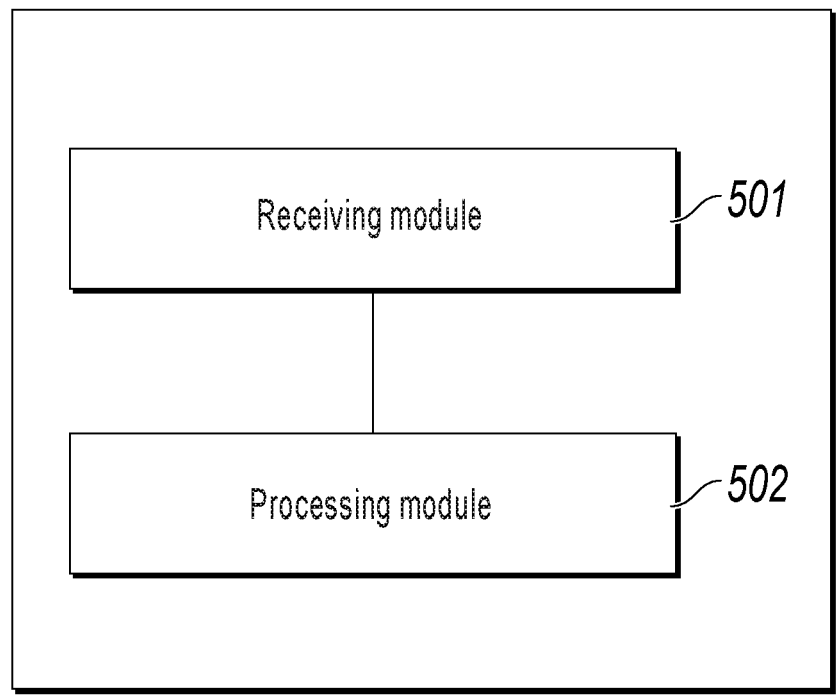
FIG. 5 is a schematic structural diagram illustrating an inquiry message processing apparatus corresponding to FIG. 3, according to an implementation of the present specification.

Based on the same idea, as shown in FIG. 4 and FIG. 5, an implementation of the present specification further provides apparatuses corresponding to the previous methods.

FIG. 4 is a schematic structural diagram illustrating a data request processing apparatus corresponding to FIG. 2, according to an implementation of the present specification. The apparatus can be located on an execution body of the procedure in FIG. 2, and include the following modules: a first receiving module 401, configured to receive a data request; a sending module 402, configured to send an inquiry message to each service node, so as to inquire whether each service node participates in calculation of responding data included in the data request; a second receiving module 403, configured to receive a participation confirmation message from the service node, where the service node sending the participation confirmation message includes a service node having corresponding service data, or a service node that has no corresponding service data but satisfies a designated condition; and the corresponding service data includes data used to calculate the responding data; and an allocation module 404, configured to allocate a resource to the service node based on the received participation confirmation message.

Optionally, before the second receiving module 403 receives the participation confirmation message from at least one service node, the sending module 402 further performs the following operation: obtaining a specific probability and sending the specific probability to each service node. The satisfying a designated condition includes a random number generated for the inquiry message is less than the specific probability.

Optionally, the specific probability is determined based on the number of all the service nodes and the designated minimum number of service nodes participating in a calculation process.

Optionally, before obtaining the specific probability and sending the specific probability to each service node, the sending module 402 further performs the following operation: determining that the number of service nodes is greater than the minimum number of service nodes participating in the calculation process.

Optionally, the allocation module 404 is configured to allocate the resource to the service node based on the received participation confirmation message, which includes determining, by the allocation module 404, a contribution of the service node based on the received participation confirmation message; and allocating a resource to the service node based on the contribution, where the resource includes a resource obtained from a sender of the data request.

Optionally, the service node is a financial institution server.

FIG. 5 is a schematic structural diagram illustrating an inquiry message processing apparatus corresponding to FIG. 3, according to an implementation of the present specification. The apparatus can be located on an execution body of the procedure in FIG. 3, and include the following modules: a receiving module 501, configured to receive an inquiry message sent by an agent node after receiving a data request, where the inquiry message is used to inquire whether each service node participates in calculation of responding data included in the data request; and a processing module 502, configured to determine whether corresponding service data is possessed, where the corresponding service data includes data used to calculate the responding data, and if the corresponding service data is not possessed, the processing module 502 determines whether a designated condition is satisfied; and if the designated condition is satisfied, the processing module 502 returns a participation confirmation message to the agent node.

Optionally, before the processing module 502 determines whether the designated condition is satisfied, the receiving module 501 further performs the following operation: receiving a specific probability sent by the agent node; and the processing module 502 determines whether the designated condition is satisfied, which includes generating, by the processing module 502, a random number, and determining whether the random number is less than a specific probability; if yes, the designated condition is satisfied; otherwise, the designated condition is not satisfied.

Optionally, after determining whether the corresponding service data is possessed, the processing module 502 further performs the following operation: if the corresponding service data is possessed, returning the participation confirmation message to the agent node.

Optionally, the specific probability is determined based on the number of all the service nodes and the designated minimum number of service nodes participating in a calculation process.

Optionally, the service node is a financial institution server.

Based on the same idea, the present implementation of the present specification further provides a data request processing device corresponding to FIG. 2, and the data request processing device includes at least one processor; and a memory communicatively connected to the at least one processor, where the memory stores an instruction that can be executed by the at least one processor, and the instruction is executed by the at least one processor, so as to enable the at least one processor to receive a data request; send an inquiry message to each service node, so as to inquire whether each service node participates in calculation of responding data included in the data request; receive a participation confirmation message from the service node, where the service node sending the participation confirmation message includes a service node having corresponding service data, or a service node that has no corresponding service data but satisfies a designated condition, and the corresponding service data includes data used to calculate the responding data; and allocate a resource to the service node based on the received participation confirmation message.

Based on the same idea, the present implementation of the present specification further provides an inquiry message processing device corresponding to FIG. 3, and the inquiry message processing device includes at least one processor; and a memory communicatively connected to the at least one processor, where the memory stores an instruction that can be executed by the at least one processor, and the instruction is executed by the at least one processor, so as to enable the at least one processor to receive an inquiry message sent by an agent node after a data request is received, where the inquiry message is used to inquire whether each service node participates in calculation of responding data included in the data request; determine whether corresponding service data is possessed, where the corresponding service data includes data used to calculate the responding data; and if the corresponding service data is not possessed, determine whether a designated condition is satisfied; and if the designated condition is satisfied, return a participation confirmation message to the agent node.

Based on the same idea, the present implementation of the present specification further provides a non-volatile computer storage medium corresponding to FIG. 2, where the non-volatile computer storage medium stores a computer executable instruction, and the computer executable instruction is set to perform the following operations: receiving a data request; sending an inquiry message to each service node, so as to inquire whether each service node participates in calculation of responding data included in the data request; receiving a participation confirmation message from the service node, where the service node sending the participation confirmation message includes a service node having corresponding service data, or a service node that has no corresponding service data but satisfies a designated condition, and the corresponding service data includes data used to calculate the responding data; and allocating a resource to the service node based on the received participation confirmation message.

Based on the same idea, the present implementation of the present specification further provides a non-volatile computer storage medium corresponding to FIG. 3, where the non-volatile computer storage medium stores a computer executable instruction, and the computer executable instruction is set to perform the following operations: receiving an inquiry message sent by an agent node after a data request is received, where the inquiry message is used to inquire whether each service node participates in calculation of responding data included in the data request; determining whether corresponding service data is possessed, where the corresponding service data includes data used to calculate the responding data; and if the corresponding service data is not possessed, determining whether a designated condition is satisfied; and if the designated condition is satisfied, returning a participation confirmation message to the agent node.

Particular implementations of the present specification are described above. Other implementations fall within the scope of the appended claims. In some situations, the actions or steps described in the claims can be performed in an order different from the order in the present implementation, and the desired results can still be achieved. In addition, the process depicted in the accompanying drawings does not necessarily require a particular execution order to achieve the desired results. In some implementations, multi-tasking and parallel processing can be advantageous.

The implementations in the present specification are described in a progressive way. For same or similar parts in the implementations, reference may be made to each other. Each implementation focuses on a difference from other implementations. Especially, an apparatus implementation, a device implementation, and a non-volatile computer storage medium implementation are basically similar to a method implementation, and therefore, the apparatus implementation, the device implementation, and the non-volatile computer storage medium implementation are described briefly; for related parts, reference may be made to some descriptions in the method implementation.

The apparatus, the device, and the non-volatile computer storage medium provided in the implementations of the present specification correspond to the method. Therefore, the apparatus, the device, and the non-volatile computer storage medium also have beneficial technical effects similar to a beneficial technical effect of the corresponding method. The beneficial technical effect of the method is described in detail above, and therefore, the beneficial technical effects of the corresponding apparatus, device, and non-volatile computer storage medium are omitted here for simplicity.

In the 1990s, whether a technology improvement is a hardware improvement (for example, an improvement of a circuit structure such as a diode, a transistor, or a switch) or a software improvement (improvement of a method procedure) can be obviously distinguished. However, as technologies develop, the current improvement of many method procedures can be considered as a direct improvement of a hardware circuit structure. Each designer writes a program of an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system into the PLD without requesting a chip manufacturer to design and produce an application-specific integrated circuit chip. In addition, at present, instead of manually manufacturing an integrated circuit chip, such type of programming is mostly implemented by using software of a "logic compiler". The programming is similar to a software compiler used to develop and write a program. Original code needs to be written in a particular programming language before compilation. The language is referred to as a hardware description language (HDL). There are many HDLs, such as the Advanced Boolean Expression Language (ABEL), the Altera Hardware Description Language (AHDL), the Confluence, the Cornell University Programming Language (CUPL), the HDCal, the Java Hardware Description Language (JHDL), the Lava, the Lola, the MyHDL, the PALASM, the Ruby Hardware Description Language (RHDL), etc. The Very-High-Speed Integrated Circuit Hardware Description Language (VHDL) and Verilog are most commonly used. A person skilled in the art should also understand that a hardware circuit that implements a logical method procedure can be easily obtained once the method procedure is logically programmed by using the several previous hardware description languages and the program is written into an integrated circuit.

A controller can be implemented in any appropriate method. For example, the controller can be a microprocessor or a processor, or a computer readable medium (such as software or firmware) that stores computer readable program code that can be executed by the microprocessor or the processor, a logic gate, a switch, an application-specific integrated circuit (ASIC), a programmable logic controller, or an embedded microcontroller. Examples of the controller include but are not limited to the following microcontrollers: ARC 625D, Atmel AT91SAM, Microchip PIC18F26K20, and Silicone Labs C8051F320. The memory controller can also be implemented as a part of the control logic of the memory. A person skilled in the art also knows that, in addition to the method for implementing the controller by using only the computer readable program code, logic programming can be performed on method steps to allow the controller to implement the same function in forms of the logic gate, the switch, the application-specific integrated circuit, the programmable logic controller, and the embedded microcontroller. Therefore, the controller can be considered as a hardware component, and an apparatus configured to implement various functions in the controller can also be considered as a structure in a hardware component. Or, the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described apparatus is described by dividing functions into various units. Certainly, when the present specification is implemented, the functions of each unit can be implemented in one or more pieces of software and/or hardware.

A person skilled in the art should understand that the implementations of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a magnetic disk storage, a CD-ROM, an optical memory, etc.) that include computer-usable program code.

The present specification is described with reference to the flowcharts and/or block diagrams of the method, the device (system), and the computer program product according to the implementations of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of another programmable data processing device generate an apparatus for implementing a designated function in one or more processes in the flowcharts and/or in one or more blocks in the block diagrams.

These computer program instructions can be stored in a computer readable memory that can instruct the computer or another programmable data processing device to work in a particular method, so that the instructions stored in the computer readable memory generate an artifact that includes an instruction apparatus. The instruction apparatus implements a designated function in one or more processes in the flowcharts and/or in one or more blocks in the block diagrams.

These computer program instructions can be loaded onto the computer or another programmable data processing device, so that a series of operations and steps are performed on the computer or another programmable device, thereby generating computer-implemented processing. Therefore, the instructions executed on the computer or another programmable device provide steps for implementing a designated function in one or more processes in the flowcharts and/or in one or more blocks in the block diagrams.

In a typical configuration, a computing device includes one or more processors (CPU), an input/output interface, a network interface, and a memory.

The memory can include a non-persistent storage, a random access memory (RAM), a non-volatile memory, and/or another form that are in a computer readable medium, for example, a read-only memory (ROM) or a flash memory. The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory computer-readable media (transitory media), for example, a modulated data signal and carrier.

It is worthwhile to further note that the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

The present specification can be described in the general context of computer-executable instructions, for example, a program module. Generally, a program module includes a routine, a program, an object, a component, a data structure, etc. that execute a particular task or implement a particular abstract data type. The present specification can alternatively be practiced in distributed computing environments in which tasks are executed by remote processing devices that are connected through a communications network. In a distributed computing environment, the program module can be located in both local and remote computer storage media that include storage devices.

The implementations in the present specification are described in a progressive way. For same or similar parts in the implementations, reference may be made to each other. Each implementation focuses on a difference from other implementations. Particularly, a system implementation is similar to a method implementation, and therefore, is described briefly. For related parts, reference may be made to related descriptions in the method implementation.

The previous descriptions are merely implementations of the present specification, and are not intended to limit the present application. For a person skilled in the art, the present application can have various modifications and changes. Any modifications, equivalent substitutions, improvements, etc. made in the spirit and principle of the present application shall fall into the scope of the claims in the present application.

Figure 6:
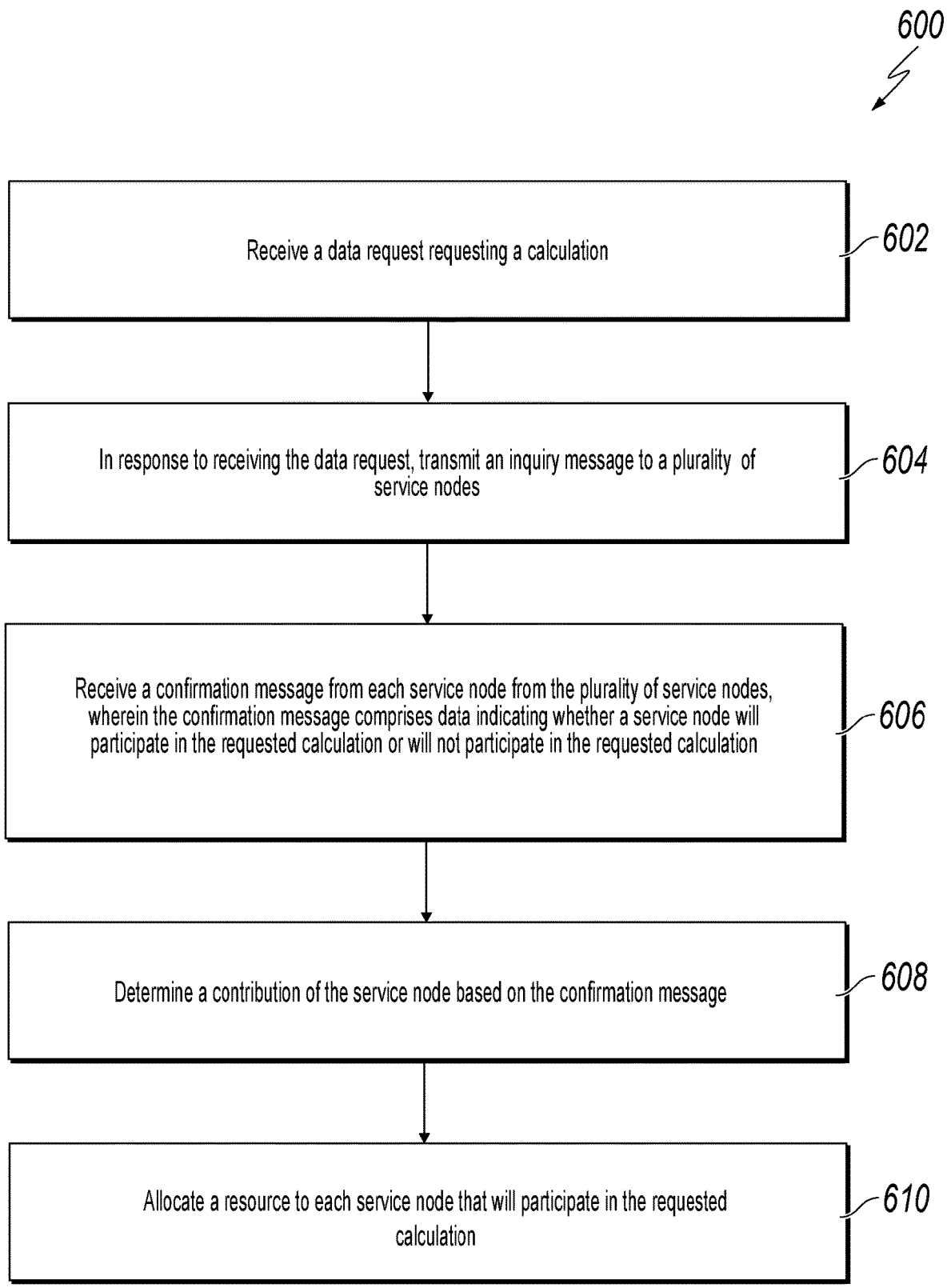
FIG. 6 is a flowchart illustrating an example of a computer-implemented method for an inquiry messaging processing method, according to an implementation of the present disclosure.

FIG. 6 is a flowchart illustrating an example of a computer-implemented method 600 for an inquiry messaging processing method, according to an implementation of the present disclosure. For clarity of presentation, the description that follows generally describes method 600 in the context of the other figures in this description. However, it will be understood that method 600 can be performed, for example, by any system, environment, software, and hardware, or a combination of systems, environments, software, and hardware, as appropriate. In some implementations, various steps of method 600 can be run in parallel, in combination, in loops, or in any order.

At 602, an agent node receives a data request requesting a calculation. The data request can include a data query request, a data analysis and mining request, or another request for a calculation. Additionally, the data request can include one or more keywords. The user can request for responding data, which can include a person's summed loan amount from multiple financial institutions. The user may not know which financial institutions include a portion of his/her loan amount. The agent node can determine this information in response to receiving the request. From 602, method 600 proceeds to 604.

At 604, in response to the agent node receiving the data request, the agent node transmits an inquiry message to a plurality of service nodes. The agent node parses the data request and determines the user's intent is to perform a calculation for corresponding responding data from the plurality of service nodes. The agent node generates an inquiry message that includes identification data of the user that transmitted the data request and a specific scenario probability. The identification can include a name, a user ID, or a membership number. The specific scenario probability can be generated by the agent node or generated by the service node. The specific scenario probability can include the number of all the service nodes, the designated minimum number of service nodes that participate in the calculation process. For example, assume that the specific probability, denoted as P, the number of all the service nodes is denoted as C, and the designated number of service nodes that participate in the calculation process is denoted as T, where T>3. The agent node can determine the specific probability by using an exemplary equation as previously mentioned:

$$P = \frac{T}{C}.$$

The agent node inserts this calculated specific probability into the inquiry message to transmit to each service node. In response, the agent node transmits the generated inquiry message to each of service node from a plurality of service nodes over a network. The service node can be a financial institution, a third party payment company, an insurance company, or another banking company. The network can be wired or wireless and over the Internet. From 604, method 600 proceeds to 606.

At 606, the agent node receives a confirmation message from each service node from the plurality of service nodes, wherein the confirmation message comprises data indicating whether a service node will participate in the requested calculation or will not participate in the requested calculation. Each service node determines whether it possesses service data corresponding to the user identification. The service node compares the identification data of the user to service data in its possession to determine if a match exists. The service data can be, for example, a portion of the user's loan financed by the corresponding service provider. In other examples, the service data can be, for example, payment history or a total loan amount corresponding to the user.

In some implementations, if the particular service node determines it has in its possession service data corresponding to the user identification from the data request, the particular service node can transmit a confirmation message back to the agent node. The confirmation message can include an indication that the service node will participate in the requested calculation. If another particular service node determines it does not have in its possession service data corresponding to the user identification from the data request (i.e., a person is not on loan from a particular financial institution), the other particular service node can opt in to the calculation based on the designated condition. The designated condition can be, for example, comparing a random number generated by the other particular service node to the specific scenario probability generated by the agent node included in the inquiry message. In some implementations, if the random number generated by the particular service node is less than the specific scenario probability generated by the agent node, then the particular service node transmits a confirmation message back to the agent node using the designated condition. If the random number generated by the particular service node is greater than the specific scenario probability generated by the agent node, then the particular service node does not transmit a confirmation message back to the agent node. The agent node can set the particular service node as the node that transmits the confirmation message with the designated condition, even if the service node does not possess service data, as the obfuscated node. The obfuscating node selected each time may dynamically change, and the designated condition may dynamically change, thereby enhancing the obfuscating effect. If all service nodes that have no corresponding service data do not satisfy the designated condition at one time, no obfuscating node may participate at that time. From 606, method 600 proceeds to 608.

At 608, the agent node determines a contribution of the service based on the confirmation message. In particular, the agent node determines the contribution of each service node based on the received confirmation message. The contribution of the service can be offered to the service node that determines to participate in the calculation. Additionally, no corresponding contribution or only a smaller contribution can be offered to the service node that determines not to participate in the calculation. For example, resources obtained from a sender of the data request can be divided based on proportions of contributions, and then allocated to corresponding service nodes that determine to participate in the calculation, no resource is allocated to a service node that does not participate in the calculation. From 608, method 600 proceeds to 610.

At 610, the agent node allocates a resource to each service node that will participate in the requested calculation. In some implementations, the resource can be directly allocated to the service node that sends the participation message instead of determining its contribution first. For example, allocating a resource to each service node that participating in the calculation can include allocating resources such as business profits and can be evenly allocated. From 610, method 600 stops.

The features of the present application provide techniques for organizing distributed calculations. For example, the system can be configured to receive a data request from a user requesting for responding data; in response to receiving the data request, transmitting an inquiry message to a plurality of service nodes; in response to transmitting the inquiry message to the plurality of service nodes, receiving a confirmation message from each service node from the plurality of service nodes, wherein the confirmation message comprises data indicating whether a service node participates in a calculation or does not participate in the calculation; determining a contribution of the service node based on the confirmation message; and allocating a resource to each service node that participates in the calculation. By performing this method, can implement risk control over an applicant loan based on a coordinated calculation between various service nodes. Additionally, for any coordinated calculation between the various service nodes, based on an idea of differential privacy, some service nodes that have no corresponding service data can be dynamically enabled to serve as obfuscating nodes to participate in the coordinated calculation. Therefore, data privacy of the service node can be improved and a service node that has no corresponding service data can be excluded from the coordinated calculation. Further, resource can be more reasonably allocated to the various service nodes (e.g., financial institutions) based on whether a particular service node participates in the calculation.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
    receiving, by an agent node server, a data request from a terminal device requesting a distributed calculation, wherein the distributed calculation is an operation that computes an aggregation of quantitative data associated with a user, and wherein the quantitative data is distributed among a plurality of service node servers such that some service node servers store data to be used in the distributed calculation and some service node servers do not store data to be used in the distributed calculation;
    in response to receiving the data request, transmitting, by the agent node server, over a network, an inquiry message to the plurality of service node servers, wherein the inquiry message comprises identification data of the user;
    determining, by each service node server of the plurality of service node servers, whether to participate in the distributed calculation based on determining whether the service node server stores quantitative data to be used in the distributed calculation;
    sending, by each service node server of a plurality of service node servers storing data to be used in the distributed calculation, a confirmation message to the agent node server representing that the service node server will participate in the distributed calculation;
    sending, by at least one service node server that does not store data to be used in the distributed calculation, an obfuscation message to the agent node server;
    receiving, over the network, by the agent node server, a plurality of confirmation messages and at least one obfuscation message, the confirmation messages and the at least one obfuscation message defining which of the plurality of service node servers store data to be used in the distributed calculation and which of the plurality of service node servers that do not store data to be used in the distributed calculation will serve as obfuscation servers for the distributed calculation; and
    performing the distributed calculation using the plurality of service node servers storing data to be used in the distributed calculation and one or more of the plurality of service node servers that do not store data to be used in the distributed calculation.

2. The method of claim 1, wherein each service node server of the plurality of service node servers comprises a financial institution server.

3. The computer-implemented method of claim 1, comprising:
    generating, by the at least one service node server that does not store data to be used in the distributed calculation, a random number; and
    based on the random number in comparison to a designated condition, determining, by the at least one service node server that does not store data to be used in the distributed calculation, whether to participate in the distributed calculation.

4. The computer-implemented method of claim 3, wherein the designated condition comprises a threshold value generated by the agent node server.

5. The computer-implemented method of claim 1, further comprising:

generating, by the agent node server, a specific scenario probability, wherein the specific scenario probability is based on a number of the plurality of service node servers and a designated minimum number of service node servers that will participate in the distributed calculation; and transmitting, by the agent node server, the specific scenario probability to each service node server of the plurality of service node servers.

6. The computer-implemented method of claim 1, comprising:

determining, by the agent node server, that a designated minimum number of service node servers to participate in the distributed calculation is greater than a number of the plurality of service node servers; and in response to determining, by the agent node server, that the designated minimum number of service node servers is greater than the number of the plurality of service node servers, determining that each service node server of the plurality of service node servers can participate in the distributed calculation.

7. A non-transitory, computer-readable medium storing one or more instructions that, when executed by a computer system, cause the computer system to perform operations comprising:

receiving, by an agent node server, a data request from a terminal device requesting a distributed calculation, wherein the distributed calculation is an operation that computes an aggregation of quantitative data associated with a user, and wherein the quantitative data is distributed among a plurality of service node servers such that some service node servers store data to be used in the distributed calculation and some service node servers do not store data to be used in the distributed calculation;

in response to receiving the data request, transmitting, by the agent node server, over a network, an inquiry message to the plurality of service node servers, wherein the inquiry message comprises identification data of the user;

determining, by each service node server of the plurality of service node servers, whether to participate in the distributed calculation based on determining whether the service node server stores quantitative data to be used in the distributed calculation;

sending, by each service node server of a plurality of service node servers storing data to be used in the distributed calculation, a confirmation message to the agent node server representing that the service node server will participate in the distributed calculation;

sending, by at least one service node server that does not store data to be used in the distributed calculation, an obfuscation message to the agent node server;

receiving, over the network, by the agent node server, a plurality of confirmation messages and at least one obfuscation message, the confirmation messages and the at least one obfuscation message defining which of the plurality of service node servers store data to be used in the distributed calculation and which of the plurality of service node servers that do not store data to be used in the distributed calculation will serve as obfuscation servers for the distributed calculation; and performing the distributed calculation using the plurality of service node servers storing data to be used in the distributed calculation and one or more of the plurality of service node servers that do not store data to be used in the distributed calculation.

8. The non-transitory, computer-readable medium if claim 7, wherein each service node server of the plurality of service node servers comprises a financial institution server.

9. The non-transitory, computer-readable medium of claim 7, wherein the operations comprise:

generating, by the at least one service node server that does not store data to be used in the distributed calculation, a random number; and based on the random number in comparison to a designated condition, determining, by the at least one service node server that does not store data to be used in the distributed calculation, whether to participate in the distributed calculation.

10. The non-transitory, computer-readable medium of claim 9, wherein the designated condition comprises a threshold value generated by the agent node server.

11. The non-transitory, computer-readable medium of claim 7, wherein the operations further comprise:

generating, by the agent node server, a specific scenario probability, wherein the specific scenario probability is based on a number of the plurality of service node servers and a designated minimum number of service node servers that will participate in the distributed calculation; and transmitting, by the agent node server, the specific scenario probability to each service node server of the plurality of service node servers.

12. The non-transitory, computer-readable medium of claim 7, wherein the operations further comprise:

determining, by the agent node server, that a designated minimum number of service node servers to participate in the distributed calculation is greater than a number of the plurality of service node servers; and in response to determining, by the agent node server, that the designated minimum number of service node servers is greater than the number of the plurality of service node servers, determining that each service node server of the plurality of service node servers can participate in the distributed calculation.

13. A computer-implemented system, comprising:

one or more computers; and one or more computer memory devices interoperably coupled with the one or more computers and having tangible, non-transitory, machine-readable media storing one or more instructions that, when executed by the one or more computers, cause the one or more computers to perform one or more operations comprising:

receiving, by an agent node server, a data request from a terminal device requesting a distributed calculation, wherein the distributed calculation is an operation that computes an aggregation of quantitative data associated with a user, and wherein the quantitative data is distributed among a plurality of service node servers such that some service node servers store data to be used in the distributed calculation and some service node servers do not store data to be used in the distributed calculation;

in response to receiving the data request, transmitting, by the agent node server, over a network, an inquiry message to the plurality of service node servers, wherein the inquiry message comprises identification data of the user;

determining, by each service node server of the plurality of service node servers, whether to participate in the distributed calculation based on determining whether the service node server stores quantitative data to be used in the distributed calculation;

sending, by each service node server of a plurality of service node servers storing data to be used in the distributed calculation, a confirmation message to the agent node server representing that the service node server will participate in the distributed calculation;

sending, by at least one service node server that does not store data to be used in the distributed calculation, an obfuscation message to the agent node server;

receiving, over the network, by the agent node server, a plurality of confirmation messages and at least one obfuscation message, the confirmation messages and the at least one obfuscation message defining which of the plurality of service node servers store data to be used in the distributed calculation and which of the plurality of service node servers that do not store data to be used in the distributed calculation will serve as obfuscation servers for the distributed calculation; and performing the distributed calculation using the plurality of service node servers storing data to be used in the distributed calculation and one or more of the plurality of service node servers that do not store data to be used in the distributed calculation.

14. The computer-implemented system of claim 13, wherein each service node server of the plurality of service node servers comprises a financial institution server.

15. The computer-implemented system of claim 13, wherein the operations comprise:

generating, by the at least one service node server that does not store data to be used in the distributed calculation, a random number; and based on the random number in comparison to a designated condition, determining, by the at least one service node server that does not store data to be used in the distributed calculation, whether to participate in the distributed calculation.

16. The computer-implemented system of claim 15, wherein the designated condition comprises a threshold value generated by the agent node server.

17. The computer-implemented system of claim 13, wherein the operations further comprise:

generating, by the agent node server, a specific scenario probability, wherein the specific scenario probability is based on a number of the plurality of service node servers and a designated minimum number of service node servers that will participate in the distributed calculation; and transmitting, by the agent node server, the specific scenario probability to each service node server of the plurality of service node servers.

18. The computer-implemented system of claim 13, wherein the operations further comprise:

determining, by the agent node server, that a designated minimum number of service node servers to participate in the distributed calculation is greater than a number of the plurality of service node servers; and in response to determining, by the agent node server, that the designated minimum number of service node servers is greater than the number of the plurality of service node servers, determining that each service node server of the plurality of service node servers can participate in the distributed calculation.

* * * * *

UNITED STATES PATENT AND TRADEMARK OFFICE
CERTIFICATE OF CORRECTION

PATENT NO. : 11,115,496 B2
APPLICATION NO. : 16/945655
DATED : September 7, 2021
INVENTOR(S) : Pengfei Ying It is certified that error appears in the above-identified patent and that said Letters Patent is hereby corrected as shown below:

In the Claims

Column 22, Line 1, in Claim 8, delete "if" and insert -- of --, therefor.

Signed and Sealed this
Twenty-third Day of November, 2021

Drew Hirshfeld
*Performing the Functions and Duties of the*
*Under Secretary of Commerce for Intellectual Property and*
*Director of the United States Patent and Trademark Office*